United States Patent
Larsson et al.

(10) Patent No.: US 8,665,790 B2
(45) Date of Patent: Mar. 4, 2014

(54) METHOD AND APPARATUS FOR CONTROLLING ACCESS TO A RADIO RESOURCE

(75) Inventors: Peter Larsson, Solna (SE); Mikael Prytz, Rönninge (SE); Yngve Selén, Uppsala (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 183 days.

(21) Appl. No.: 13/129,061

(22) PCT Filed: Mar. 23, 2009

(86) PCT No.: PCT/SE2009/050303
§ 371 (c)(1),
(2), (4) Date: May 12, 2011

(87) PCT Pub. No.: WO2010/056179
PCT Pub. Date: May 20, 2010

(65) Prior Publication Data
US 2011/0216710 A1 Sep. 8, 2011

Related U.S. Application Data

(60) Provisional application No. 61/114,579, filed on Nov. 14, 2008.

(51) Int. Cl.
| | | |
|---|---|---|
| H04W 4/00 | (2009.01) | |
| H04W 72/04 | (2009.01) | |
| H04W 16/14 | (2009.01) | |
| H04W 40/04 | (2009.01) | |
| H04W 84/18 | (2009.01) | |

(52) U.S. Cl.
CPC ............ H04W 72/04 (2013.01); H04W 16/14 (2013.01); H04W 40/04 (2013.01); H04W 84/18 (2013.01)
USPC ........................................................ 370/328

(58) Field of Classification Search
CPC ................................................... H04W 72/04
USPC ......................................................... 370/328
See application file for complete search history.

(56) References Cited

U.S. PATENT DOCUMENTS

| 7,352,728 B2 * | 4/2008 | Soomro ..................... 370/338 |
| 7,606,193 B2 * | 10/2009 | McFarland et al. ......... 370/329 |
| 2002/0080739 A1 | 6/2002 | Kuwahara |
| 2002/0080855 A1 | 6/2002 | Watanabe et al. |

FOREIGN PATENT DOCUMENTS

| EP | 1104964 A1 | 6/2001 |
| JP | H11177622 A | 7/1999 |

(Continued)

OTHER PUBLICATIONS

IEEE 802.11s—Mesh Deterministic Access, Guido R. Hiertz et al, Aug. 13-16, 2007.*

(Continued)

*Primary Examiner* — Mark Rinehart
*Assistant Examiner* — Maharishi Khirodhar
(74) *Attorney, Agent, or Firm* — Coats and Bennett, PLLC

(57) ABSTRACT

In a radio system where wireless nodes are in contact, the wireless nodes are enabled to exchange information with adjacent nodes. In addition, in one embodiment distant nodes out of range for direct communication can be communicated with by forwarding data over multiple hops. When a user, in particular a primary user, is detected by a node, a spectrum access blocking message is sent, to other nodes in the vicinity of the node thereby enabling blocking of the radio resource in a geographical area in which the other usage is detected. This means that the radio resource is blocked in that area from being accessed by other users than the primary user. The blocking message can be distributed in any suitable manner and can be tailored for the application at hand.

16 Claims, 5 Drawing Sheets

(56) References Cited

FOREIGN PATENT DOCUMENTS

| | | |
|---|---|---|
| JP | 2002198867 A | 7/2002 |
| JP | 2002198868 A | 7/2002 |
| JP | 2004274192 A | 9/2004 |
| JP | 2007166488 A | 6/2007 |
| WO | 2007056630 A2 | 5/2007 |

OTHER PUBLICATIONS

IEEE 802.1 ls—Mesh Deterministic Access, Guido R. Hiertz et al, Aug. 13-16, 2007.*

Institute of Electrical and Electronics Engineers, Inc. 802.11h, IEEE Standard for Information technology—Telecommunications and information exchange between systems—Local and metropolitan area networks—Specific Requirements, Part 11: Wireless LAN Medium Access Control (MAC) and Physical Layer (PHY) specifications, Amendment 4: Spectrum and Transmit Power Management Extension in the 5GHz band in Europe, 2003.

Hiertz, G. R. et al. "IEEE 802.11s—Mesh Deterministic Access." IEEE 14th European Wireless Conference, 2008 (EW 2008), Jun. 22, 2008, pp. 1-8.

* cited by examiner

HC
———→

SAB message with hopcounter (HC)

HC
- - - →

Overheard but not forwarded SAB message

METHOD AND APPARATUS FOR CONTROLLING ACCESS TO A RADIO RESOURCE

TECHNICAL FIELD

The present invention relates to a method and a device for controlling access to radio resources. In particular the present invention relates to control of radio resources in a radio system allowing opportunistic spectrum access.

BACKGROUND

Recent research has shown that usage of the radio spectrum is often fairly inefficient. One key factor in this is the current spectrum licensing regime. That is, some part of the radio spectrum is licensed to a party, such as an operator of a radio communications system, who is given an exclusive right to use this part of the radio spectrum. For example, even though significant parts of the useful spectrum is licensed, several measurements (see, e.g. T. Erpek, K. Steadman, D. Jones, "Spectrum Occupancy Measurements: Dublin, Ireland, Collected On Apr. 16-18, 2007", Shared Spectrum Company Report, 2007) indicate that some parts of this spectrum are highly underutilized. Therefore, a more flexible use of the radio spectrum has become a research intensive subject within which the aim is at optimizing, i.e. maximizing, the usage of the available radio spectrum.

To address the above-indicated issues, the FCC (Federal Communications Commission) took, in 2005, an initiative to open up for so-called secondary use of the spectrum. That is, radio resources that, e.g. under a license, are owned by one party—the primary party—may also be used by others (secondary users) for purposes (secondary use) that do not fall within the operation (primary use) of the primary party. Consequently, a secondary user may use radio resources owned by the primary party without having a license and without having made an explicit agreement with the primary party. A requirement for accessing radio resources as a secondary user is that the primary party should not be exposed to harmful interference caused by the secondary use. Therefore a secondary user is allowed to transmit over radio resources owned by the primary party only if it can be ensured that the primary party is, for all practical purposes, not affected.

In order to determine when a secondary user can transmit without negatively affecting the primary user some kind of mechanism must be provided. Thus, secondary users should be allowed and the mechanism should enable secondary users to access primary users' spectrum when no primary user's communication quality is (substantially) affected. One approach for assessing the (instantaneous) primary usage of spectrum is to perform sensing, i.e., using sensors (radio receivers) with the goal of measuring the presence of primary transmissions. If a sensing result does not indicate primary usage the measured spectrum may be utilized for secondary access. This type of mechanism is often denoted sensing-based opportunistic spectrum access. The overall objective, simply stated, is to increase capacity as well as individual user throughput. Existing approaches are discussed and evaluated in http://www.academypublisher.com/jcm/vol02/no02/jcm02027182.pdf and http://www.eecs.berkeley.edu/~sahai/Papers/ICC06_final.pdf.

Briefly, it can be said that collaborative sensing is built on the idea that collecting multiple sensors' information leads to increased probability of detection and reduced false-alarm probability.

Also a distributed algorithm for collaborative adaptive sensing of fields in an underwater environment is presented in http://perso.eleves.bretagne.ens-cachan.fr/~huguenin/UUST07_DistributedSampling.pdf. The idea is in part to, in a distributed manner, form clusters of nodes which jointly process gathered information and control the position of nodes for improved sampling of the field.

However, none of the above referenced methods enables protection of a larger area from undesired (interfering) secondary spectrum access. Hence there is a need for an improved method for controlling radio resources in a radio system allowing opportunistic spectrum access.

SUMMARY

It is an object of the present invention to overcome or at least reduce some of the problems associated with the existing methods of controlling opportunistic spectrum access in a radio system.

This object is obtained by the present invention as set out in the appended claims. Hence, in a radio system where wireless nodes are in contact, the wireless nodes are enabled to exchange information with adjacent nodes. In addition in one embodiment distant nodes out of range for direct communication can be communicated with by forwarding data over multiple hops. When a user, in particular a primary user, is detected by a node, a spectrum access blocking message is sent, to other nodes in the vicinity of the node thereby enabling blocking of the radio resource in a geographical area in which the other usage is detected. This means that the radio resource is blocked in that area from being accessed by other users than the primary user. The blocking message can be distributed in any suitable manner and can be tailored for the application at hand.

In accordance with one embodiment a hop/distance dependent field is updated for each hop and a node is adapted to forward the message in response to the field. For example a decrementable field is decremented for each hop and a node abstain from spectrum access if the counter field is non-negative and keep forwarding the message as long as the counter field is positive.

In accordance with one embodiment the hop/distance dependent field is reset to a starting value whenever a node has detected a primary user for a particular radio resource such as a radio channel. The starting value can also be set to a non-fixed value. Such a non-fixed starting value can for example be set in accordance with a received signal strength.

In accordance with one embodiment the spectrum access is blocked for a particular time. The time can be set in the blocking message or the system can have a default blocking time set.

In accordance with one embodiment when the invention is used in a radio system where there is no primary user the spectrum blocking method as described herein can be used as an information message which users in the radio system can use to determine which radio resources to access.

BRIEF DESCRIPTION OF THE DRAWINGS

The present invention will now be described in more detail by way of non-limiting examples and with reference to the accompanying drawings, in which.

DETAILED DESCRIPTION

In accordance with the present invention, a node detects solely or jointly with other nodes the use of a radio resource, e.g. that a user such as a primary user or another user occupies a particular radio resource and in particular a channel (or even multiple channels) in a radio system. In response to such detection a message that can be termed a Spectrum access blocking message (SAB message) is generated and disseminated in the radio system: The SAB message can in accordance with one embodiment include fields indicating the channel under consideration and/or a distance field, e.g. a down-countable field and/or a corresponding time limit for which the blocking is valid for.

A node receiving the SAB message can in accordance with one embodiment be adapted to update a distance field based on a pre-determined distributed distance limiting rule, or, if the respective node also detected a primary user or another user on the corresponding resource (and did not itself yet send a related SAB message), then reset the counter to its original value and time limit or a non-fixed value that for example can depend on the received signal strength, and forward it further to adjacent nodes until the field reaches a predetermined value. Thanks to the reset of the counter value the union of the areas needed to be protected from spectrum access by individual nodes is protected.

A node receiving the SAB message can be adapted to be prevented from accessing the corresponding resource if the distance field indicates that the blocking is active. An additional precondition can be that a blocking time limit has not been met.

Figure 1:
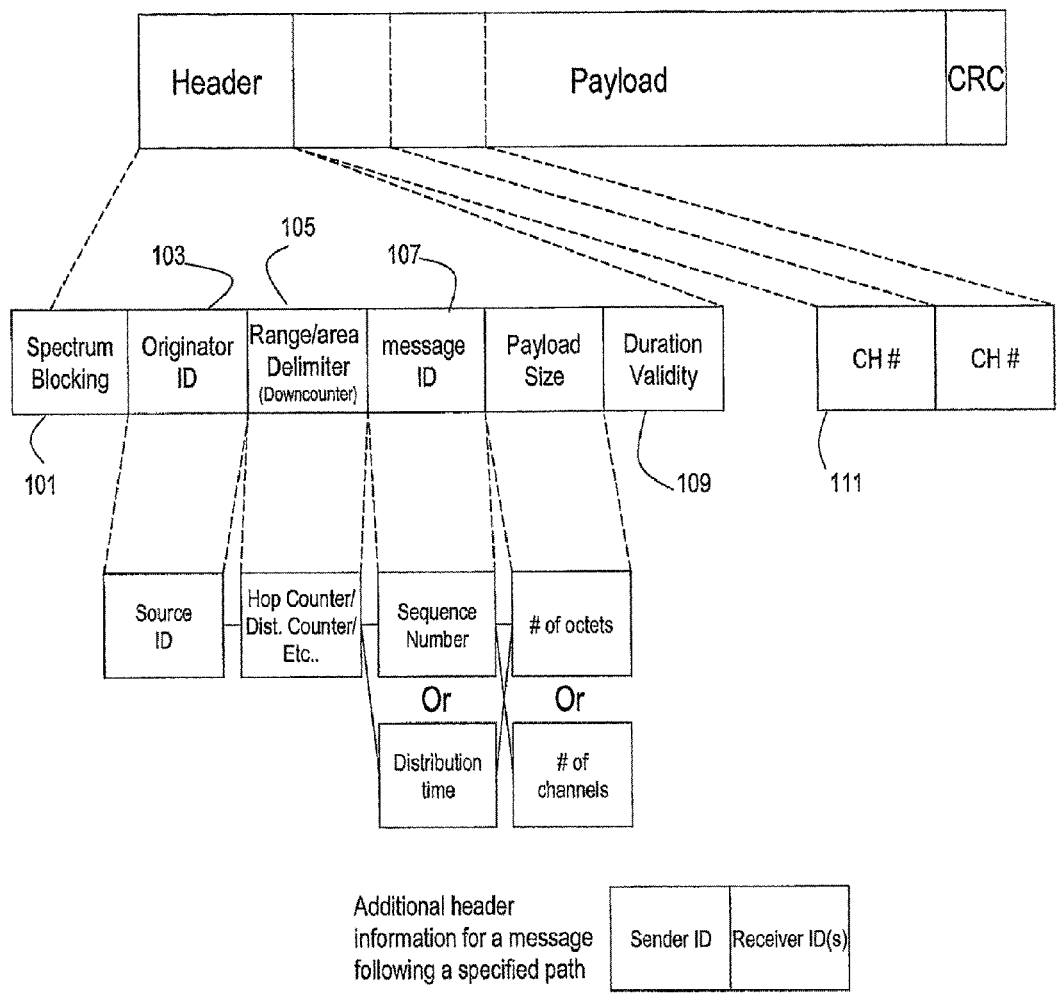
FIG. 1 is a view illustrating a spectrum access blocking message.

A spectrum access blocking message that blocks some area around a node which has detected primary usage can have various formats. Some examples are illustrated in FIG. 1. Hence the blocking message can comprise a field 101 indicating that it comprises spectrum blocking information. The message can comprise a field 103 indicating the identity of the originating node. The message can comprise an updatable field 105 indicating the distance the message has traveled. The message can comprise a field 107 indicating a message identification. The message can comprise a field 109 indicating the time for which the blocking is valid. The message can comprise a field 111 indicating which radio resources/channels that are blocked.

To limit unnecessary forwarding of messages, each piece of information (or a message with many smaller pieces of information) can be tagged with a sequence number or a time tag enabling a receiving node to determine whether the message has already been forwarded by the node, if it is still valid or not (the blocking message may be too old according to the time stamp), or if a message blocking the same resource(s) was recently sent by the receiving node. In accordance with one embodiment a message is only forwarded if the message is decided to be valid.

As the detection mainly has local relevance, the flooding of this information should preferably be accomplished with some localization constraints. Various types of information can be used for the updatable distance field, such as hop-count, estimated cumulative node-to-node distance, etc.

Hops: As one example, one may specify that the request message may be sent at most N hops by setting a hop counter in the message to N which is counted downwards for each hop. When the hop counter reaches zero no further forwarding is performed. This is a simple but fairly coarse approach, as the hops may be of different lengths.

Cumulative estimated distance: One could also base a distance value in the distance field on estimated distances. This may be derived from the received power level, knowledge of the transmit power, and assumptions of the propagation conditions to estimate the distance a message is transmitted. A counter representing the permitted distance for the flooded message can then be updated, for example be counted downwards until reaching or passing zero after which no further forwarding is allowed.

Distributing the SAB message to many nodes can be accomplished in several ways, for example by:

Broadcasting: The message follows a predetermined broadcast tree path. The tree may have been established through a preceding sensing phase.

Flooding: Any user overhearing a new message will consider forwarding it.

Broadcasting using a broadcast tree can generally be made more reliable than Flooding, but requires overhead by setting up the tree. The aspect of reliability is manifold. For example, a broadcast tree can be defined such that the probability of message collision (i.e. the instantaneous Signal to Noise Ratio (SNR) is too low to support the used data rate) is low, or the links defined in the tree use acknowledgement on correctly received data and a number of retransmissions take place if the forwarding fails.

Broadcast trees can be determined in different ways. A tree may be computed based on the Bellman Ford algorithm, see e.g. the book "Flows in Networks" by Ford Fulkerson using some metric as input such as hop, estimated hop-distance, estimated path loss, estimated inverse rate, etc.

Figure 2:
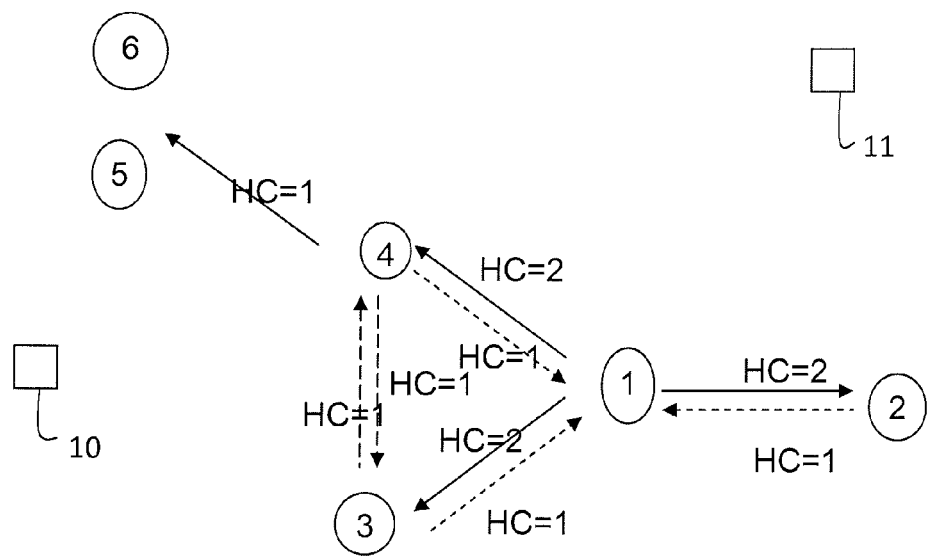
FIG. 2 is a view illustrating a first scenario.

In FIG. 2 an exemplary scenario with six nodes in the own system further illustrating the method and nodes 1-6 as described herein is depicted. Also, there are some other users 10 and 11 from another (or several other) system(s) present in FIG. 2. In this case node 1 has detected (falsely or accurately) that there is some type of communication ongoing, over some resources, in another system, and intends to block use of these resources by itself and nearby nodes in the own system. Node 1 blocks the resources internally and sends a SAB message with the hop counter value set to 2 using flooding. Nodes 2, 3 and 4 are within reach of node 1 and receive the SAB message. Each of them decreases the hop counter by 1 to the value 1, registers the blocked channels internally, and forwards the SAB message using flooding. Node 1 receives the forwarded SAB message from nodes 2, 3 and 4, but recognizes the same message that it transmitted and does not take any further action. Nodes 3 and 4 are within reach and receive the forwarded SAB message from one another. However, they recognize the message as a message they have already received and acted upon, and do not take any further action. Node 5 receives the SAB message from node 4 and registers the blocked channels internally. It then decreases the hop counter to the value 0 and notes that the message should not be forwarded any further. Thus, node 6, within reach of node 5, does not receive the SAB message and is free to consider use of the channel. This makes sense, because node 6 is distant enough from node 1 so the resource may be available at the node 6 location.

Figure 3:
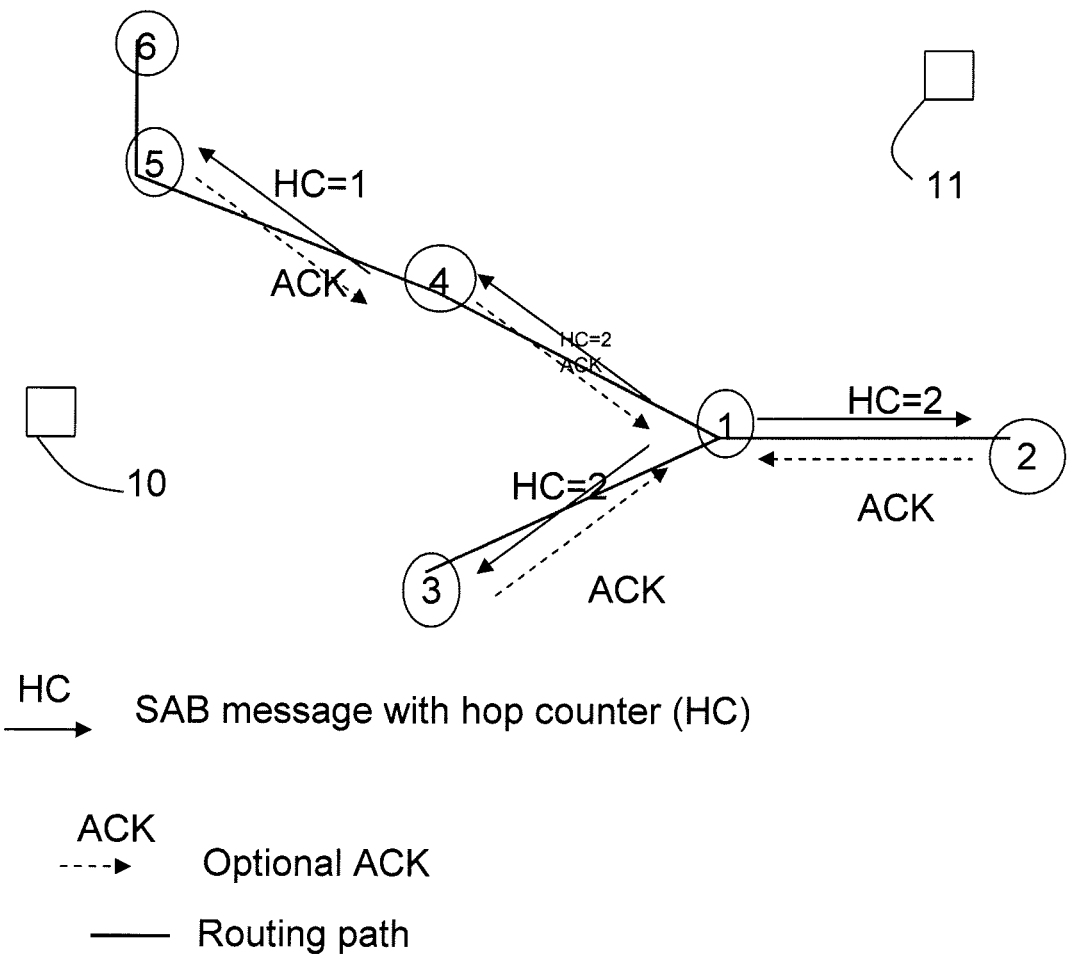
FIG. 3 is a view illustrating a second scenario.

In FIG. 3 another exemplary scenario with six nodes in the own system, numbered 1 to 6 and connected in a broadcast routing tree according to the figure is shown. Also, there are some other users from another (or several other) system(s). In this case node 1 has detected (falsely or accurately) that there is some type of communication ongoing in another system, and intends to block use of these resources by itself and nearby nodes in the own system. Node 1 blocks the resources internally and sends a SAB message with the hop counter value set to 2 to its neighboring nodes in the broadcast tree. Nodes 2, 3 and 4 receive the SAB message. Each of them decreases the hop counter by 1 to the value 1, registers the blocked channels internally, and forwards the SAB message to their neighboring nodes (but not back to node 1). Node 5 receives the SAB message from node 4 and registers the blocked channels internally. It then decreases the hop counter to the value 0 and notes that the message should not be forwarded any further. Thus, node 6, although connected to node 5, does not receive the SAB message and is free to consider use of the channel (this makes sense, because node 6 is far enough from node 1 so the resource may be available at the node 6 location). Optionally, each correctly received message can be acknowledged (ACKed) as depicted in FIG. 3.

Figure 4:
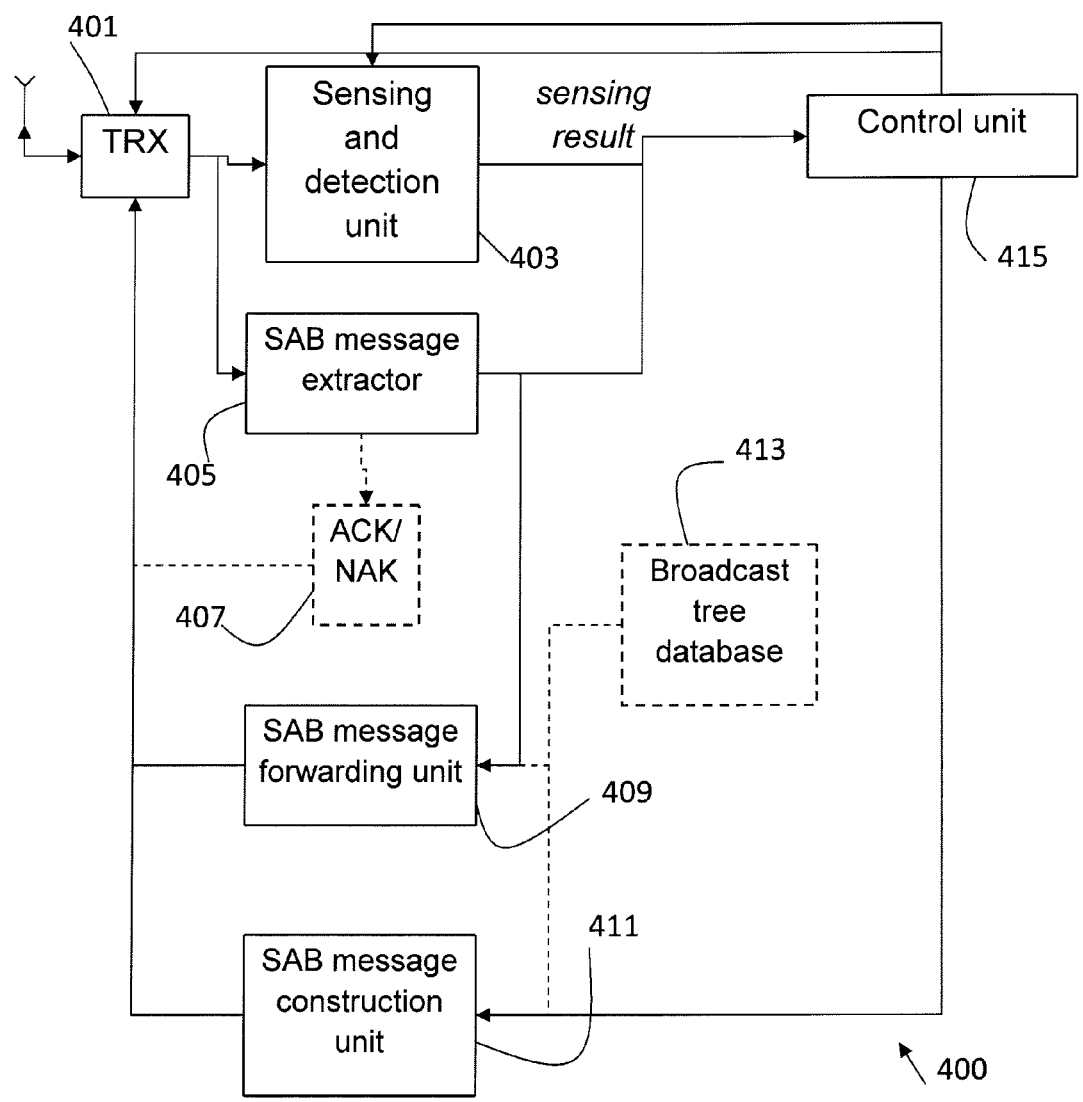
FIG. 4 is a view illustration functional blocks of a node.

In FIG. 4 functional blocks of a node 400 capable of executing functionalities in accordance with one exemplary embodiment described herein are shown. The node can thus in accordance with one embodiment comprise the following:
TRX: Transmit and receive unit 401 for transmitting and receiving data.
Sensing and detection unit: A unit 403 capable of calculating an estimate of the probability of usage of a resource, based upon at least an own measurement.
SAB message extractor: A unit 405 for identifying a message as a SAB message, for extracting the information on blocked channels and pass that information on to the control unit (which keeps track on which channels are blocked) and/or to the SAB message forwarding unit 409.
ACK/NAK: A unit 407, which can ACK or NAK received SAB messages to ensure reliable SAB message delivery.
SAB message forwarding unit: The SAB message forwarding unit 409 is adapted to decide whether a received SAB message should be forwarded or not and gives such a message the correct format and updates relevant fields (such as hop counter or similar) before passing it to the TRX unit 401.
SAB message construction unit: The SAB message construction unit 411 is a unit adapted to construct a new SAB message given information on which channels to block, for how long, etc., from the Control unit 415.
Broadcast tree database: The broadcast tree database unit 413 is a unit adapted to keep track of neighboring nodes, for example, in one or more forwarding tables if the messages are transmitted in a broadcasting tree.
Control: The control unit 415 is adapted to control the SAB functionality. The unit 415 can for example be adapted to keep track of which channels are currently blocked, to decide whether new SAB messages should be constructed, to activate the TRX unit and Sensing and detection unit whenever a sensing should be performed, etc.
Example of Operation A:

The Control unit 415 keeps track on when to perform sensing (for example, according to a periodic scheme). When it is time to perform a sensing, the Control unit 415 activates the TRX unit 401 and the Sensing and detection unit 403. Based on information from the TRX unit 401 the Sensing and detection unit 403 forms an estimate of the probability of a channel being used and forwards this to the Control unit 415. If the Control unit 415 decides based upon at least this probability that a channel should be blocked, it sends information to the SAB message construction unit 411 so that it can form a SAB message (possibly using information from the Broadcast tree database unit). This SAB message is then sent to the TRX unit 401 and transmitted.

Example of Operation B:

The TRX unit 401 receives a message. This message is passed on to the SAB message extractor 405, which identifies the message as a SAB message and extracts the information on which channels to block and for how long. In accordance with one scenario the SAB message extractor 405 sends a message to the ACK unit 407, which ACKs (or NAKs, if the message was not correctly received) the received SAB message. The information extracted by the SAB message extractor 405 is sent to the Control unit 415, which registers the blocked channels with the intention that the device, prior to utilizing any channels, checks with the Control unit 415 which channels are blocked and avoids using these. The SAB message information is also sent from the SAB message extractor 405 to the SAB message forwarding unit 407 which decides whether the message should be forwarded or not. If the message should be forwarded, the SAB message forwarding unit 407 updates the message fields, and sends the message to the TRX unit 401 for forwarding.

Figure 5:
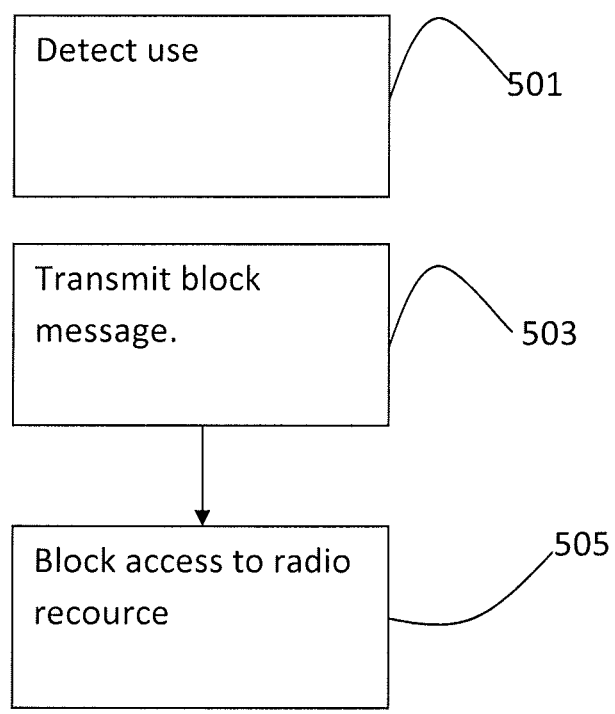
FIG. 5 is a flowchart depicting some procedural steps performed by a wireless node.

In FIG. 5 a flowchart depicting some of the procedural steps performed by a wireless node as described above is shown. Thus, a wireless node for controlling access to a radio spectrum in a radio system is provided. The wireless node is in contact with and exchange information with other wireless nodes of the radio system. The wireless node can perform the following procedural steps. First in a step 501 the wireless node detects use of a radio resource by a user in the radio system. Next in a step 503 the wireless node transmits a message for blocking access to the detected radio resource to at least one other wireless node of the radio system. Based on such a message blocking access, a wireless node controls access to a radio resource, in a step 505.

Using the method and radio system node in a radio system will provide a very simple and distributed approach to block users in the vicinity of a user who has detected a primary user (at some resource), from causing interference to the primary user by accessing its spectrum.

The invention claimed is:

1. A wireless node in a radio system configured to exchange information with other wireless nodes in the radio system, the wireless node comprising:
   a sensing and detection circuit configured to detect use of a first radio resource by a primary user of that first radio resource;
   a transmit and receive circuit; and
   a message construction circuit configured to construct a first message and to transmit that first message, via the transmit and receive circuit, to at least one other wireless node in the radio system, the first message directing the at least one other wireless node to, for a particular amount of time, block access to the detected first radio resource by one or more secondary users of that first radio resource,
   a message extractor configured to identify a second message received via the transmit and receive circuit as directing the wireless node to block access to a second radio resource by one or more secondary users of that second radio resource;
   a message forwarding circuit configured to forward the second message to one or more other wireless nodes, the second message thereby being transmitted over multiple hops.

2. The wireless node according to claim 1, wherein the message construction circuit is configured to transmit the first message to one or more other wireless nodes in the vicinity of the wireless node, thereby blocking access to the first radio resource in a geographical area around the location at which usage of the first radio resource by the primary user is detected.

3. The wireless node according to claim 1, wherein the message forwarding circuit is configured to update a hop or distance dependent field of the second message before forwarding that second message to the one or more other wireless nodes.

4. The wireless node according to claim 1, wherein the message forwarding circuit is configured to reset a hop or distance dependent field of the second message to a starting value before forwarding that second message to the one or more other wireless nodes, if the sensing and detection circuit has itself detected use of the second radio resource by a primary user of that second radio resource.

5. The wireless node according to claim 4, wherein the starting value is set dynamically.

6. The wireless node according to claim 1, wherein the message construction circuit is configured to set a time field in the first message for blocking access to the first radio resource for said particular amount of time.

7. The wireless node according to claim 1, further comprising a control circuit configured to track which radio resources the wireless node is to block access to by secondary users, and wherein the wireless node is configured to check with the control circuit before allowing secondary users to access a radio resource.

8. The wireless node according to claim 1, wherein said one or more secondary users comprise a plurality of said secondary users.

9. A method implemented by a wireless node in a radio system for controlling radio resource access, wherein the wireless node is configured to exchange information with other wireless nodes in the radio system, the method comprising:
 detecting use of a first radio resource by a primary user of that first radio resource, and
 transmitting to at least one other wireless node in the radio system a first message that directs the at least one other wireless node to, for a particular amount of time, block access to the detected first radio resource by one or more secondary users of that first radio resource,
 receiving a second message;
 identifying the second message as directing the wireless node to block access to a second radio resource by one or more secondary users of that second radio resource; and
 forwarding the second message to one or more other wireless nodes, the second message thereby being transmitted over multiple hops.

10. The method according to claim 9, wherein said transmitting comprises transmitting the first message to other wireless nodes in the vicinity of the wireless node, thereby blocking access to the first radio resource in a geographical area around the location at which usage of the first radio resource by the primary user is detected.

11. The method according to claim 9, further comprising updating a hop or distance dependent field of the second message before forwarding that second message to the one or more other wireless nodes.

12. The method according to claim 9, further comprising resetting a hop or distance dependent field of the second message to a starting value before forwarding that second message to the one or more other wireless nodes, if the wireless node has itself detected use of the second radio resource by a primary user of that second radio resource.

13. The method according to claim 12, wherein the starting value is set dynamically.

14. The method according to claim 9, further comprising setting a time field in the first message for blocking access to the first radio resource for said particular amount of time.

15. The method according to claim 9, further comprising checking, before allowing secondary users to access a radio resource, which radio resources the wireless node is to block access to by secondary users.

16. The method according to claim 9, wherein said one or more secondary users comprise a plurality of said secondary users.

* * * * *